(12) United States Patent
Hijii

(10) Patent No.: US 6,922,573 B2
(45) Date of Patent: Jul. 26, 2005

(54) PORTABLE CELLULAR PHONE CAPABLE OF DETECTING ITS FOLDING STATE

(75) Inventor: Kazuyoshi Hijii, Tokyo (JP)

(73) Assignee: NEC Corporation, Tokyo (JP)

( * ) Notice: Subject to any disclaimer, the term of this patent is extended or adjusted under 35 U.S.C. 154(b) by 372 days.

(21) Appl. No.: 10/077,299

(22) Filed: Feb. 15, 2002

(65) Prior Publication Data

US 2002/0119802 A1 Aug. 29, 2002

(30) Foreign Application Priority Data

Feb. 28, 2001 (JP) ........................................ 2001-055201

(51) Int. Cl.[7] .......................... H04M 1/00; H01H 9/20; G01R 33/06
(52) U.S. Cl. .............................. 455/575.3; 379/433.13; 335/192; 335/170; 324/207.2
(58) Field of Search ................................ 301/679, 730; 455/575.3, 575.1, 90.3, 550.1, 575.4, 556.1, 556.2, 347, 348, 349, 350, 351; 379/433.01, 433.02, 433.06, 433.11, 433.12, 433.13; 335/78, 84, 85, 207, 205, 229, 177, 179, 202, 192, 182, 167, 170, 108, 91, 92; 330/6; 324/200, 207.11, 207.13, 207.2

(56) References Cited

U.S. PATENT DOCUMENTS

| | | | | |
|---|---|---|---|---|
| 4,947,759 A | * | 8/1990 | Uhl ............................ | 246/249 |
| 5,673,314 A | | 9/1997 | Olkoshi et al. ........ | 379/433.13 |
| 6,060,969 A | * | 5/2000 | Hufgard et al. ............. | 335/207 |
| 6,230,028 B1 | | 5/2001 | Shirakawa ............... | 455/575.8 |
| 6,314,183 B1 | * | 11/2001 | Pehrsson et al. ........ | 379/433.06 |
| 6,701,166 B2 | * | 3/2004 | Lim ......................... | 455/575.3 |
| 2001/0041543 A1 | * | 11/2001 | Lim ........................... | 455/575 |
| 2002/0019216 A1 | * | 2/2002 | Horiguchi ................... | 455/575 |
| 2002/0119802 A1 | * | 8/2002 | Hijii ........................... | 455/575 |

FOREIGN PATENT DOCUMENTS

| | | | |
|---|---|---|---|
| CN | 2321177 | 5/1999 | ............ H04M/1/10 |
| DE | 199 05 302 | 8/1999 | ............ H04M/1/02 |

* cited by examiner

Primary Examiner—Rafael Perez-Gutierrez
(74) Attorney, Agent, or Firm—Scully, Scott, Murphy & Presser

(57) ABSTRACT

A portable cellular phone is provided which is capable of surely detecting a state of folding of phone bodies by detection of a weak magnetic field produced by a receiver. A first phone body has a Hall integrated circuit (IC) adapted to detect a magnetic flux formed by a receiver. When the first phone body and a second phone body are folded closed, a magnetic flux density of the magnetic flux that is formed by the receiver and passes through the Hall IC is changed by a magnetic material placed in the second phone body.

7 Claims, 4 Drawing Sheets

PORTABLE CELLULAR PHONE CAPABLE OF DETECTING ITS FOLDING STATE

BACKGROUND OF THE INVENTION

1. Field of the Invention

The present invention relates to a folding portable cellular phone having a function of detecting its folding state.

The present application claims priority of Japanese Patent Application No. 2001-055201 filed on Feb. 28, 2001, which is hereby incorporated by reference.

2. Description of the Related Art

Devising and developing work on configurations and functions of a portable cellular phone is proceeding in order to meet an increasing need for making the portable phone smaller and more lightweight and for enhancing its usability. One example of a result from such efforts is a folding portable cellular phone which can be folded by a division of a phone body into two portions, thereby enabling it to fit into a bag or pocket and therefore improving its portability.

There are some folding portable cellular phones which have a function of detecting their folding state. This kind of the folding portable cellular phone, while being folded, automatically stops a supply of power to a displaying section such as a liquid crystal display (LCD) and/or to each part of circuits (except some circuits such as a timer circuit or a like) to reduce power consumption and, immediately after it is opened, the phone lights up its displaying section and starts operations of its circuits.

In order to detect the folding state of phone bodies, in some cases, a magnet is incorporated in one phone body which is coupled to an other phone body by using, for example, a hinge and a lead switch adapted to operate in response to a magnetic flux of the magnet attached to the other phone body. In other cases, a mechanical switch is attached to one phone body being also coupled to an other phone body and a protrusion portion adapted to push the mechanical switch with pressure is formed on the other phone body.

However, such the conventional folding portable cellular phone has a problem. That is, in the folding portable cellular phone using the magnet and lead switch as a means for detecting the folding state of the phone bodies, to ensure operations of the lead switch, a magnet having the intensity of a magnet field exceeding a level is required and therefore the magnet having such a high intensity of the magnet field affects circuit components and/or acoustic components in the phone body in some cases. For example, a vibration caused by sound signals and magnetic force occurs in the vicinity of a microphone and/or receiver of the portable cellular phone, which causes a phenomenon in which the microphone picks up the vibration and outputs it as a voice to a party on the other end of the phone and a noise is output from the receiver. On the other hand, in the folding portable cellular phone using the mechanical switch and the protrusion as a means for detecting the folding state, when the phone body is dropped on a floor, the protrusion portion is easily broken, causing the detecting operation to become impossible.

SUMMARY OF THE INVENTION

In view of the above, it is an object of the present invention to provide a portable cellular phone capable of surely detecting a state of folding of phone bodies by detection of a weak magnetic field produced by a receiver.

According to a first aspect of the present invention, there is provided a portable cellular phone including:

a first phone body having a receiver;

a second phone body being coupled to the first phone body by using a hinge such that said first and second phone bodies may be folded closed;

a magnetic flux detector placed in the first phone body and operated to detect a magnetic flux formed by the receiver; and a magnetic material placed in the second phone body and used to change a magnetic flux density (hereinafter, referred simply to as density) of the magnetic flux that is formed by the receiver and passes through the magnetic flux detector when the first and second phone bodies are folded closed.

With the above configuration, the density of the magnetic flux passing through the magnetic flux detector and, in response to the decrease of the magnetic flux, a voltage output from the magnetic flux detector also decreases and therefore it is made possible to surely detect a state in which the first and second phone bodies are folded closed.

In the foregoing first aspect, a preferable mode is one wherein the magnetic material is placed within a magnetic field of the magnetic flux passing through the magnetic flux detector.

Also, a preferable mode is one wherein the magnetic flux detector includes a Hall integrated circuit.

With the above configuration, the magnetic flux passing through the magnetic flux detector can be surely decreased by the magnetic material.

According to a second aspect of the present invention, there is provided a portable cellular phone including:

a first phone body having a receiver;

a second phone body being coupled to the first phone body by using a hinge such that said first and second phone bodies may be folded closed;

a magnetic flux detector placed in the first phone body and operated to detect a magnetic flux formed by the receiver; and a magnet placed in the second phone body and used to change a density of the magnetic flux that is formed by the receiver and passes through the magnetic flux detector when the first and second phone bodies are folded closed.

With the above configuration, the density of the magnetic flux passing through the magnetic flux detector is changed greatly and therefore it is made possible to detect a state in which the first and second phone bodies are folded closed.

In the foregoing second aspect, a preferable mode is one wherein the magnet is mounted to cause lines of magnetic force to pass through the magnetic flux detector, the lines of magnetic force formed by the magnet having a reverse sense of direction to that of lines of magnetic force formed by the receiver in the magnetic flux detector.

Also, a preferable mode is one wherein the magnetic flux detector includes a Hall integrated circuit.

With the above configuration, the density of magnetic flux passing through the magnetic flux detector can be greatly decreased when the first and second phone bodies are folded closed and therefore it is made possible to surely detect a state in which the first and second phone bodies are folded closed.

Also, a preferable mode is one wherein the magnet is mounted to cause lines of magnetic force to pass through the magnetic flux detector, the lines of magnetic force formed by the magnet having a same sense of direction as that of lines of magnetic force formed by the receiver in the magnetic flux detector.

With the above configuration, a state in which the density of magnetic flux passing through the magnetic flux detector has increased when the first and second phone bodies are folded closed can be detected and therefore it is made possible to easily confirm a state of an opening and closing of both of the phone bodies.

Furthermore, a preferable mode is one wherein the magnet provides the magnetic field of weak intensity being required to make remarkable changes in outputs from the magnetic flux detector in cooperation with the receiver.

With the above configurations, the first phone body is provided with the magnetic flux detector adapted to detect the magnetic flux of the receiver and, when the first and second phone bodies are folded closed, the density of the magnetic flux that is formed by the receiver and passes through the magnetic flux detector is changed by the magnetic material placed in the second phone body and therefore an output voltage from the magnetic flux detector decreases in response to a decrease of the density of the magnetic flux passing through the magnetic flux detector, which enables a state in which the first and second bodies are folded closed to be reliably detected. By using a signal obtained from the detection, if necessary, the ON/OFF of lighting-up of the LCD, for example, can be automatically controlled, thus providing an advantage in that this configuration is contributory to a saving in energy.

With another configuration, the magnet is used instead of the magnetic material, which can change greatly the density of the magnetic flux passing through the magnetic flux detector and therefore a state in which the first and second bodies are folded closed can be reliably detected. Moreover, by using the magnet which causes lines of magnetic force having a sense of direction reverse to that of the line of magnetic force that is formed by the receiver and passes through the magnetic flux detector to pass through the magnetic flux detector, the density of the magnetic flux passing through the magnetic flux detector can be greatly decreased when the first and second phone bodies are folded closed and therefore the opening and closing state of the phone bodies can be surely and easily confirmed. Moreover, by causing both the lines of magnetic force of the magnet and the receiver to have a same sense of direction, a remarkable increase of the density of the magnetic flux passing through the magnetic flux detector when both the phone bodies are folded closed can be detected, which enables a state of the opening and closing of the first and second bodies to be surely and easily confirmed.

Furthermore, by placing the magnetic material within a magnetic field of the magnetic flux passing through the magnetic flux detector when the first and second phone bodies are folded closed, the magnetic flux passing through the magnetic flux detector can be surely decreased by the magnetic material and by using the magnet that can provide the magnetic field of weak intensity being required to make remarkable changes in outputs from the magnetic flux detector in cooperation with the receiver and by making the magnet small-sized so that it does not affect acoustic components, a state of folding closed of the first and second bodies can be detected with high sensitivity.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
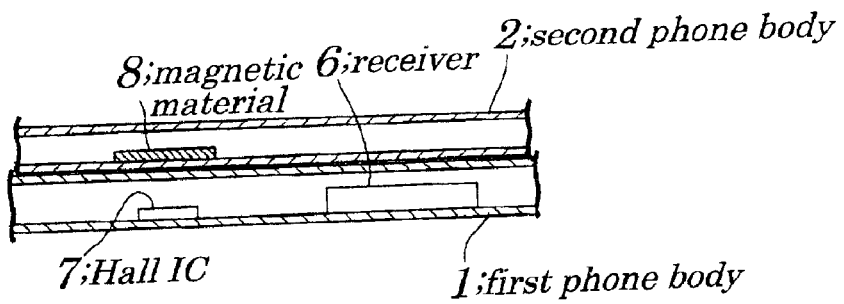
FIG. 1 is a sectional view conceptually showing configurations of main components of a portable cellular phone according to an embodiment of the present invention.
Figure 2:
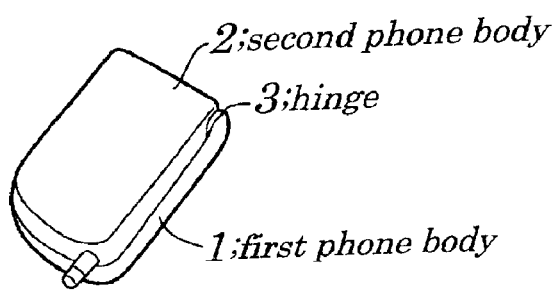
FIG. 2 is a perspective view illustrating a state in which the portable cellular phone is closed according to the embodiment of the present invention.
Figure 3:
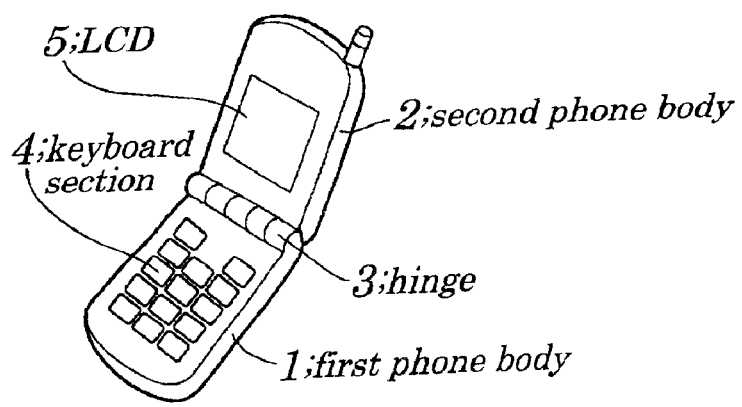
FIG. 3 is a perspective view illustrating a state in which the portable cellular phone is opened according to the embodiment of the present invention.

FIG. 1 is a sectional view conceptually showing configurations of main components of a portable cellular phone according to an embodiment of the present invention. FIG. 2 is a perspective view conceptually illustrating a state in which the portable cellular phone is closed according to the embodiment. FIG. 3 is a perspective view conceptually illustrating a state in which the portable cellular phone is opened according to the embodiment. In the portable cellular phone of the embodiment, a first phone body 1 is coupled to a second phone body 2 by using a hinge 3 so that they can be freely opened and closed. The first phone body 1 is provided with a keyboard section 4 used to input or select various data and the second body 2 is provided with an LCD 5. As shown in FIG. 1, a receiver 6 used to output a received voice is embedded in the first phone body 1. The receiver 6 is a voice outputting device to vibrate a vibrating plate by a voice current flowing through a coil of an electromagnet. The core of the electromagnet is in a magnetic state by residual magnetism even when the voice current is not flowing and is producing a magnetic flux having a specified strength of the magnetic field.

Moreover, in the first phone body 1, a Hall IC 7 is provided at a place where the magnetic flux produced by the receiver 6 passes through. Therefore, the Hall IC 7 is in a position to always detect the magnetic flux produced by the receiver 6. The Hall IC 7 is constructed by incorporating a Hall device and an amplifier into an IC which has a very high detection sensitivity to magnetic fluxes and therefore can detect the magnetic flux produced by the receiver 6 with high sensitivity. On the other hand, in the second phone body 2, a magnetic material 8 is placed at a place being opposite to the Hall IC 7 approximately in a vertical direction. As the magnetic material 8, an alloy made up of iron, nickel, cobalt or a like, or iron oxide, ferrite, or a like is used. There are two types of the Hall ICs 7, one being responsive only to the magnetic flux having one sense of direction and another being simultaneously responsive to both the magnetic flux and the other magnetic flux having respectively a sense of direction reverse to each other.

Figure 4:
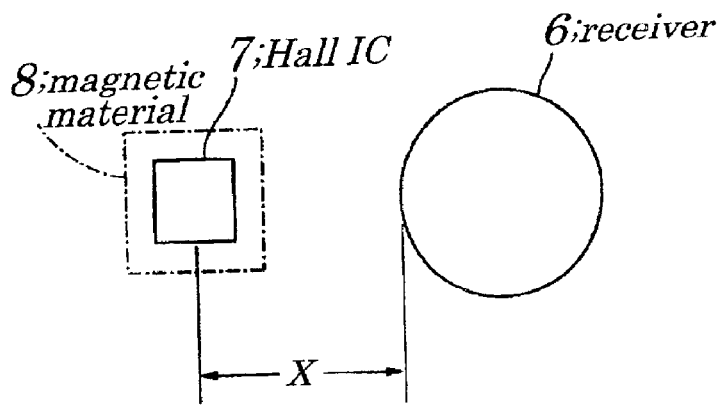
FIG. 4 is a diagram explaining a relation between a distance from a Hall IC to a receiver and magnetic flux density of the receiver according to the embodiment of the present invention.
Figure 5:
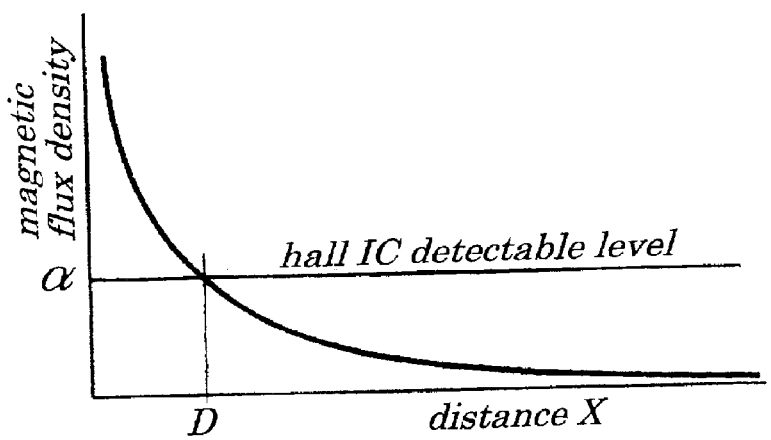
FIG. 5 is a diagram showing a characteristic of the relation between the distance between the Hall IC and the receiver and magnetic flux density of the receiver according to the embodiment of the present invention.

Therefore, when the first phone body 1 and second phone body 2 are folded closed, as described later, since the magnetic material 8 comes near to the Hall IC 7, the magnetic flux passing through the Hall IC 7 decreases. In response to the decrease of the magnetic flux, an output from the Hall IC 7 also decreases. By detection of the decrease of the magnetic flux, whether or not the first phone body 1 and second phone body 2 are folded closed can be judged. By using the result from the judgement, a supply of power to, for example, the LCD 5 can be automatically controlled. Positions of the Hall IC 7 and the receiver 6 are determined by the intensity of the magnetic field produced by the receiver 6 and the sensitivity of the Hall IC 7. If a distance between one end of the receiver 6 and a center of the Hall IC 7 is represented by "X" as shown in FIG. 4, a relation between the magnetic flux density of the Hall IC 7 and the distance "X" is as shown in FIG. 5 can be graphed. This indicates that the distance in which the Hall IC 7 can detect the magnetic flux density "α" is a distance being below "D" or less.

Figure 6:
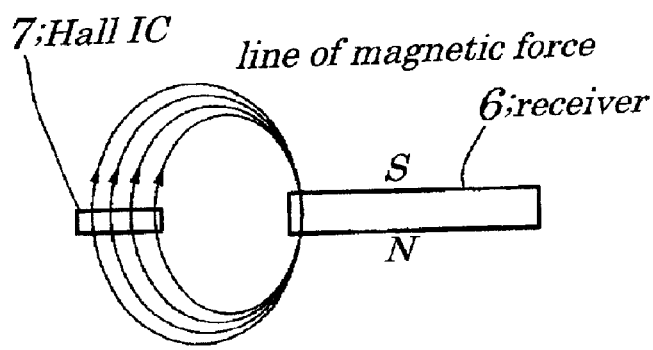
FIG. 6 is a diagram illustrating how lines of magnetic force produced by the receiver passes through the Hall IC according to the embodiment of the present invention.

FIG. 6 shows how lines of magnetic force produced by the receiver 6 passes through the Hall IC 7 in a state in which the first phone body 1 and second phone body 2 are not folded each other. In this case, all the lines of magnetic force has a sense of direction from a north pole of the receiver 6 to the Hall IC 7 and a sense of direction from the Hall IC 7 to a south pole of the receiver 6. Therefore, in this state, the Hall IC 7 outputs a voltage exceeding a specified level.

Figure 7:
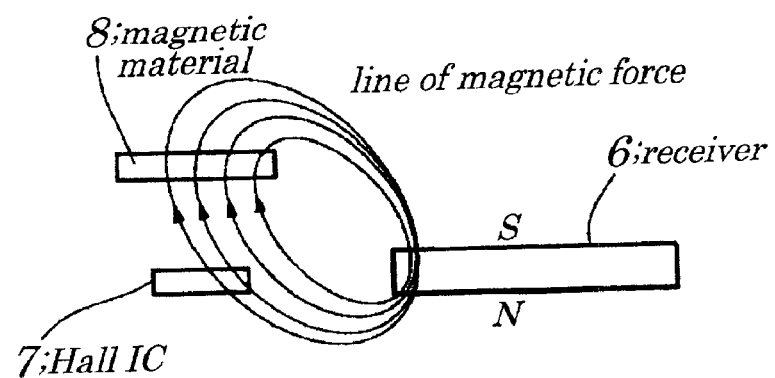
FIG. 7 is a diagram explaining a state in which passage of lines of magnetic force through the Hall IC is changed by a magnetic material according to the embodiment of the present invention.

On the other hand, when the first phone body 1 and second phone body 2 are folded closed, the magnetic material 8 placed in the second phone body 2 comes nearest to the Hall IC 7 placed in the first phone body 1. At this point, as shown in FIG. 7, the lines of magnetic force produced by the receiver 6 are attracted by the magnetic material 8 and therefore the number of the lines of magnetic force passing through the Hall IC 7 decreases. That is, the magnetic field exerting an influence on the Hall IC 7 decreases in intensity. As a result, an output voltage from the Hall IC 7 decreases and a state in which the first phone body 1 and second phone body 2 are folded closed can be detected. In accordance with a result from the detection, it is made possible to automatically stop lighting-up (illumination) of, for example, the LCD 5. This enables avoidance of adverse affects on acoustic components caused by the conventional use of the magnet having strong magnetic force.

Figure 8:
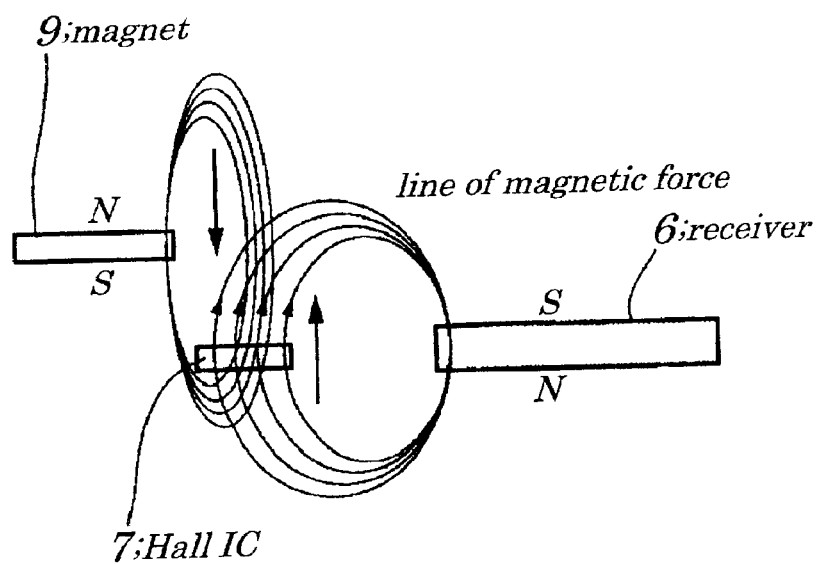
FIG. 8 is a diagram illustrating a state in which the line of magnetic force passing through the Hall IC can be decreased or emission of the line of magnetic force is stopped by a magnet having a weak magnetic field according to the embodiment of the present invention.

It is apparent that the present invention is not limited to the above embodiments but may be changed and modified without departing from the scope and spirit of the invention. For example, in the above embodiment, the density of the magnetic flux passing through the Hall IC 7 is changed by causing the magnetic material 8 to come near to or to leave the Hall IC 7, however, the density of the magnetic flux passing through the Hall IC 7 may be changed by using, instead of the magnetic material 8, a magnet having a sufficiently weak magnetic field. FIG. 8 shows a state in which the north pole and south pole of the receiver 6 are placed in a direction reverse to those of a magnet 9. In this case, a direction of the line of magnetic force produced by the magnet 9 is opposite to that of the line of magnetic force produced by the receiver 6, in which the magnet 9 and the receiver 6 cancel out each other's magnetic forces. As a result, when the first phone body 1 and second phone body 2 are folded closed and the magnet 9 comes nearest to the Hall IC 7, the density of the magnetic flux passing through the Hall IC 7 becomes small and an output from the Hall IC 7 decreases and stops. Therefore, by detection of the decrease or stop of the output from the Hall IC 7, whether or not the first phone body 1 and second phone body 2 are folded closed can be reliably judged.

Figure 9:
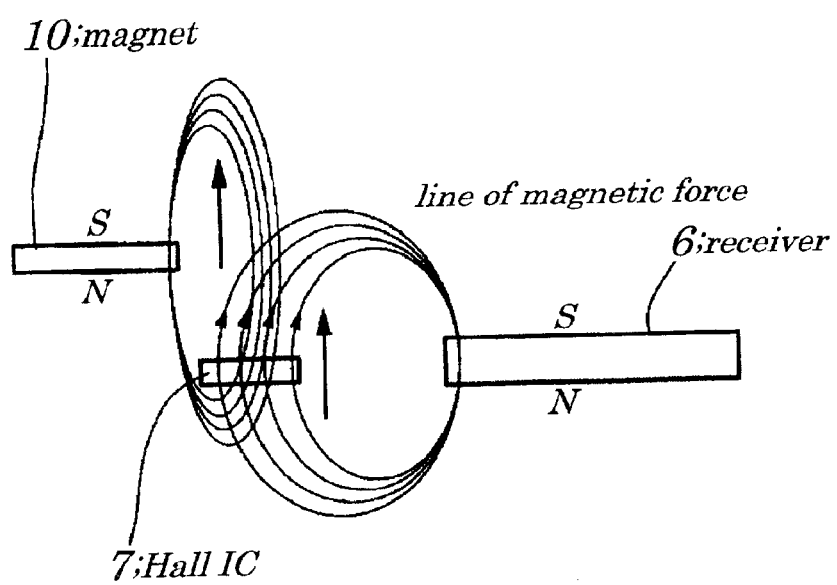
FIG. 9 is a diagram illustrating a state in which the line of magnetic force passing through the Hall IC can be increased by the magnet having the weak magnetic field according to the embodiment of the present invention.

Moreover, FIG. 9 shows a state in which the north pole and south pole of the receiver 6 are placed in same direction as those of a magnet 10. In this case, a direction of the line of magnetic force produced by the magnet 10 is the same as that of the line of magnetic force produced by the receiver 6, in which the magnet 10 and the receiver 6 increase the magnetic force of each other. As a result, when the first phone body 1 and second phone body 2 are folded closed and the magnet 10 comes nearest to the Hall IC 7, the density of the magnetic flux passing through the Hall IC 7 becomes large and a level of a voltage output from the Hall IC 7 rises. Therefore, by detection of the rise of the voltage output from the Hall IC 7, whether or not the first phone body 1 and second phone body 2 are folded closed can be reliably judged. Moreover, the magnet 9 and magnet 10 must be small as much as possible so that they do not affect acoustic components of the portable cellular phone.

Magnetic flux detector is not limited to a Hall integrated circuit (device).

What is claimed is:

1. A portable cellular phone comprising:

a first phone body having a receiver and a first case body made up of a first inner cover plate and a first outer cover plate;

a second phone body being coupled to said first phone body by using a hinge such that said first and second phone bodies may be folded closed, said second phone body having a second case body made up of a second inner cover plate and a second outer cover plate, said second inner cover plate closely facing said first inner cover plate in a state where said first and second phone bodies are folded closed;

a Hall integrated circuit placed in said first phone body and operated to detect a magnetic flux formed by said receiver; and a magnet placed in said second phone body and used to change a magnetic flux density of said magnetic flux that is formed by said receiver and passes through said Hall integrated circuit when said first and second phone bodies are folded closed, wherein a center of said Hall integrated circuit is located at a specified distance away from an end of said receiver along a direction parallel to a plane of said first phone body, wherein said Hall integrated circuit is so configured to be placed between said receiver and said magnet, when said first and second phone bodies are folded closed to each other, and wherein said Hall integrated circuit is located in said first outer cover plate and said magnet is located in said second inner cover plate.

2. The portable cellular phone according to claim 1, wherein said magnet is mounted to cause lines of magnetic force to pass through said Hall integrated circuit, said lines of magnetic force formed by said magnet having a reverse sense of direction to that of lines of magnetic force formed by said receiver in said Hall integrated circuit.

3. The portable cellular phone according to claim 1, wherein said magnet is mounted to cause lines of magnetic force to pass through said Hall integrated circuit, said lines of magnetic force formed by said magnet having a same sense of direction as that of lines of magnetic force formed by said receiver in said Hall integrated circuit.

4. The portable cellular phone according to claim 1, wherein said magnet provides a magnetic field of weak intensity being required to make remarkable changes in outputs from said Hall integrated circuit in cooperation with said receiver.

5. A portable cellular phone comprising:

a first phone body having a receiver and a first case body made up of a first inner cover plate and a first outer cover plate;

a second phone body being coupled to said first phone body by using a hinge such that said first and second phone bodies may be folded closed, said second phone body having a second case body made up of a second inner cover plate and a second outer cover plate, said second inner cover plate closely facing said first inner cover plate in a state where said first and second phone bodies are folded closed;

a Hall integrated circuit located in said first phone body at a location where a magnetic flux produced by said receiver passes through, such that said Hall integrated circuit can always detect said magnetic flux produced by said receiver; and a magnetic material located in said second phone body at a location where said magnetic flux changes in passing through said Hall integrated circuit when said first and second phone bodies are folded closed;

wherein said Hall integrated circuit is located in said first outer cover plate and said magnetic material is located in said second inner cover plate.

6. The portable cellular phone according to claim 5, wherein said magnetic material and said Hall integrated circuit are configured so as to overlap each other in respective center portions at a specified distance from each other, when said first and second phone bodies are folded closed to each other.

7. The portable cellular phone according to claim 5, wherein said magnetic material comprised iron oxide, ferrite, or an alloy consisting essentially of iron, nickel and cobalt.

* * * * *